United States Patent

Stanton

[15] 3,688,898
[45] Sept. 5, 1972

[54] PHONOGRAPH RECORD ENVELOPE WITH FOAM STRIP

[72] Inventor: David Christopher Stanton, Banbury, England

[73] Assignee: Plastic Innovations Limited, London, England

[22] Filed: Oct. 15, 1970

[21] Appl. No.: 80,922

[30] Foreign Application Priority Data

Oct. 23, 1969 Great Britain..........51,129/69
Oct. 23, 1969 Great Britain..........51,949/69

[52] U.S. Cl. ..............................206/62 P, 206/45.34
[51] Int. Cl. ............................................B65d 85/30
[58] Field of Search ..........40/104.18, 106.1; 129/20; 211/40; 206/62 R, 62 P, 45.34; 229/68; 312/9, 10, 12

[56] References Cited

UNITED STATES PATENTS

| 2,881,912 | 4/1959 | Kursh | 206/62 P |
| 1,448,616 | 4/1924 | Robbins | 206/62 P UX |
| 2,726,758 | 12/1955 | Brower | 206/62 P UX |
| 3,436,744 | 2/1948 | Chouinard | 206/62 P UX |
| 3,317,038 | 5/1967 | Bade et al. | 206/62 P |
| 958,059 | 5/1910 | Wright | 206/62 P |

FOREIGN PATENTS OR APPLICATIONS

| 822,305 | 10/1959 | Great Britain | 312/10 |
| 1,209,881 | 10/1970 | Great Britain | 206/62 P |

Primary Examiner—Joseph R. Leclair
Assistant Examiner—Steven E. Lipman
Attorney—Marn & Jangarathis

[57] ABSTRACT

An improved gramophone record sleeve or other container for a flat article uses the minimum of expensive material of the cardboard variety, with plastics sheet materials, and consists of a cover formed of two relatively hingeable portions, preferably of cardboard, at least one of the cover portions having secured to its inner face a portion of polymeric material (which may constitute a transparent plastics sleeve) for holding the record or other flat article within the cover; preferably, an edge of the sleeve which is left open for inserting and withdrawing the record is lined with one or more strips of resilient foam plastics material.

12 Claims, 15 Drawing Figures

PATENTED SEP 5 1972 3,688,898
SHEET 1 OF 4
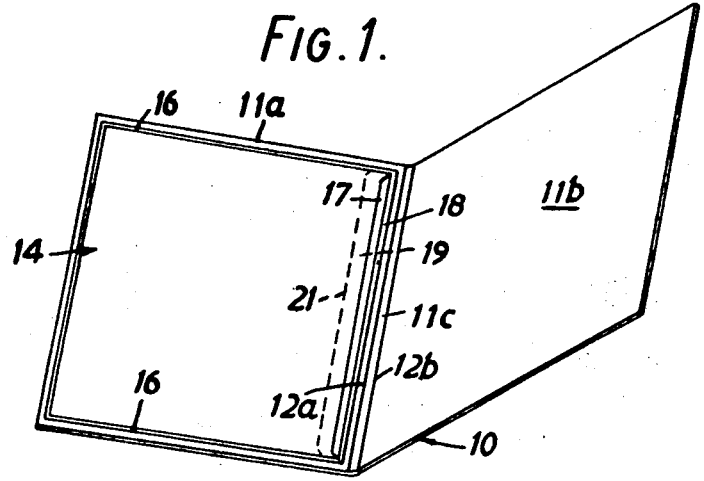
FIG.1.
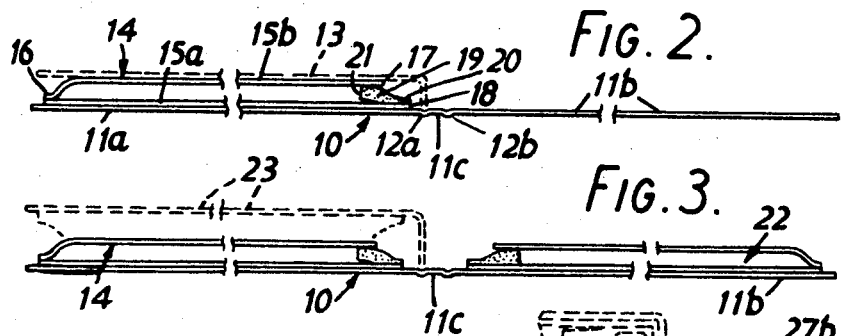
FIG.2.
FIG.3.
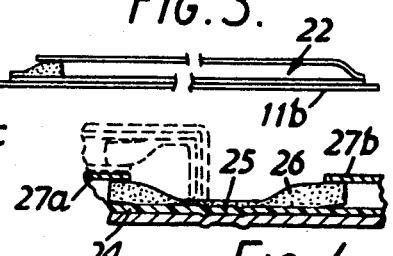
FIG.4.
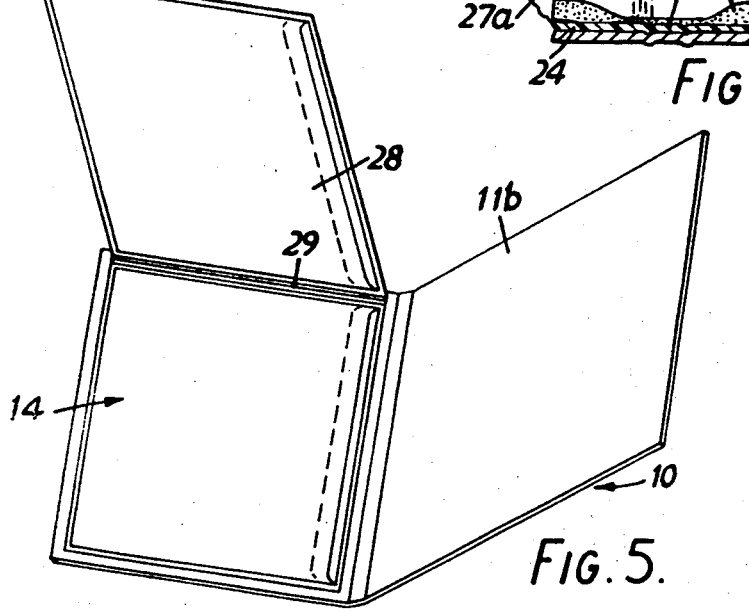
FIG.5.

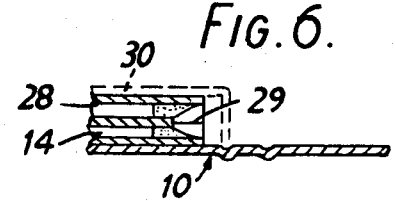
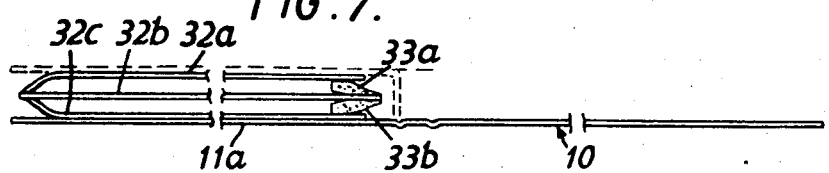
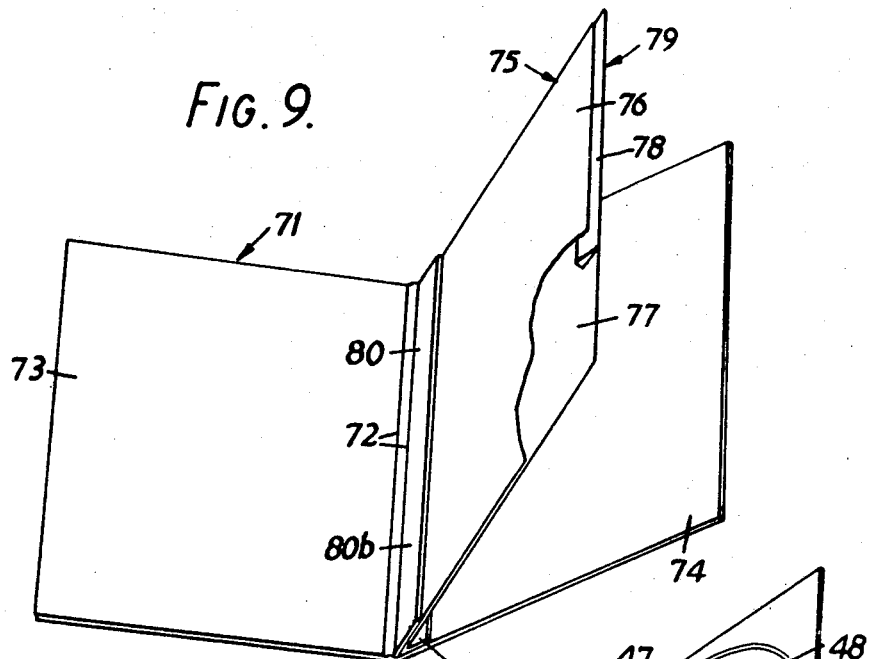
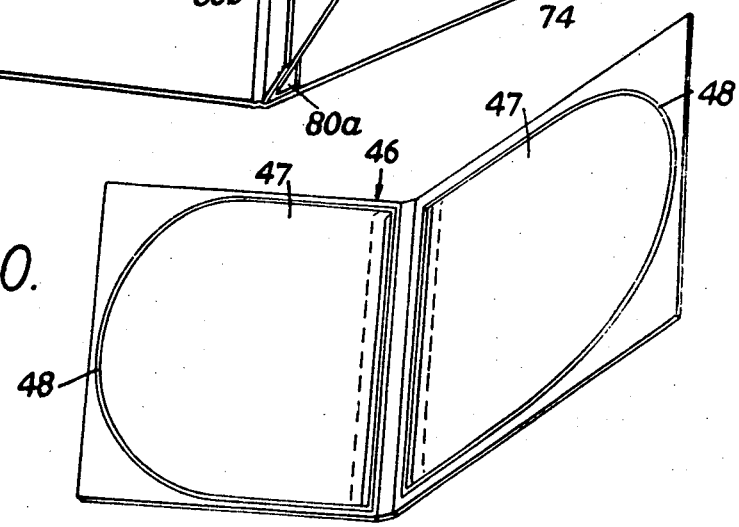

PHONOGRAPH RECORD ENVELOPE WITH FOAM STRIP

This invention relates to containers and is concerned in particular with containers for holding flat articles, which containers include a pair of portions of sheet material joined along their edges to form a flat pocket, parts of the edges being unjoined to provide a slot through which the article can be inserted into and withdrawn from the container. The invention therefore concerns containers of envelope-like form for articles such as photographs, X-ray plates, punch cards and other objects of flat form, in particular, the invention provides improvements in containers for holding gramophone records. Because of the large sales of gramophone records and because the containers of the invention have particular advantage in relation to them, the invention will be described mainly with respect to gramophone record containers, though it will be appreciated that the invention provides advantages in the packaging of other forms of flat articles and so is not limited to the packaging of gramophone records.

Though gramophone records have been commercially important for many years, up until recently most were sold in relatively simple containers which remained essentially the same in construction over several decades. Such containers consisted of a sleeve or cover, consisting of two square sheets of cardboard or paper joined along three sides and having one open side for insertion and withdrawal of the record. It was common practice to house the record in a paper or other lightweight inner or liner, which usually had central openings to allow the record labels to be read without removing the record from the inner. Such inners have been made of paper, thus resembling the simplest kind of sleeve or cover, and/or plastics material; many ideas have been put forward for improving inners, in particular so as to facilitate separation of the edges at the open side and to minimize folding of the corners, where they project beyond the record, when the inner and its record are returned to the sleeve or cover. The recommended practice is to place the inner in the sleeve so that the open side of one does not coincide with the open side of the other, as this prevents the record from accidentally falling out and precludes the entry of dust. However, the provision of a separate inner or liner, which amounts to the provision of a second sleeve, is expensive and troublesome and, moreover, as the inner is normally located within the sleeve, there is little advantage in using its large areas for explanatory material, nor can its make-up contribute to making the container and contents more attractive and saleable.

Sleeves or covers need to carry explanatory material, e.g. information about the music on the record, and also to make a strong appeal to potential buyers. Also, they need to be as inexpensive as possible, while nevertheless being attractive and durable; it will be realized that it is difficult to reconcile all of the main factors which are required in a record sleeve. It is common practice for at least the front surface of the sleeve, which is normally made of high-quality cardboard, to be provided with a film or coating of plastics material, to enhance its appearance and increase its resistance to wear. Cardboard of a suitable quality is always in great demand throughout the packaging and related industries and so the manufacturer of record sleeves is faced with the dilemma of making a high-quality, durable product, using as his main constructional material one which is difficult to obtain. However, record manufacturers rely to a great extent upon the sales appeal of the sleeve or cover, especially in relation to recordings of popular music, which form the major proportion of recording companies' output. These conflicting factors apply especially in relation to "pop" music on record, where modern publicity methods repeatedly bring new releases to the attention of a large buying public and, consequently, the demand for particular records is massive, but of short duration. The record manufacturer thus requires the sleeve manufacturer to be able to fulfil a series of large but short-lived production runs, so that record sleeves also need to be capable of rapid production, using the minimum of expensive materials, involving the minimum of wastage of materials and also the simplest of manufacturing steps.

Plastics sheet materials can greatly assist in achieving economic production of record sleeves and inners and they are generally much more readily available than cardboard and like paper products, though they have the disadvantage of being much more difficult and costly to print.

In recent years especially, it has become customary to market records in "albums" instead of in sleeves or covers. The essential difference between a sleeve and an album is that the former is a pocket or envelope and the latter is book-like, having a component which can be pivoted relative to another. Albums have utility particularly for sets of records, where two or more records are sold together, each usually being housed in an inner or liner and all being contained in a box-like album. The use of albums has developed to include book-like albums which consist of two or more sleeves hinged together about a common side or some alternative form of two-part cover containing pockets or recesses for receiving one or more records, sometimes with separate pamphlets or other literature. A simple form of album, for a single record, consists of a square sleeve having a square cover hingedly connected to one edge, usually the one at the open side of the sleeve; this latter arrangement has the advantage that, when the cover is folded over the sleeve, it closes the open side. Such a simple form of album has the added advantage of providing up to twice the space of a corresponding sleeve for attractive and informative printing, but also represents a markedly increased amount of cardboard and a more complex assembly job.

The present invention provides improved forms of containers for flat articles, which are especially suitable for gramophone records and which make improved use of the economic and other factors discussed above. The containers of the invention provide at least some of the advantages of known record sleeves and albums, while also providing other advantages and additionally avoiding or minimizing at least some of the disadvantages of known containers.

In the following part of this specification, the expressions below have the following meanings:

"sleeve" means a flat container of envelope or pocket form for a flat article, comprising front and back components of sheet material joined at their edges and having an opening along parts of their edges large enough to accommodate the article;

"cover" (contrary to the meaning used above) means an outer component of a flat container, comprising two portions of sheet material which are relatively hingeable about adjacent edges, the two portions not necessarily being integrally joined together;

"sheet material" means paper, cardboard, plastics material or other flat constructional material;

"polymeric material" means transparent polyvinyl chloride sheets or any other sheet plastics material which is transparent and may be colored or colorless;

According to this invention, a container for receiving a flat article comprises a cover formed from at least two portions of sheet material, having at least one portion of polymeric material disposed adjacent the inner face of at least one of the portions forming the cover, whereby the article can be located between the portion of polymeric material and the associated portion of sheet material so as to be visible through the polymeric material when the cover is opened out.

According to a preferred form of this invention, a container for receiving a gramophone record comprises a cover formed from at least two substantially square portions of sheet material which are arranged side-by-side and so as to be relatively hingeable about their adjacent sides, having a sleeve or polymeric material secured inside at least one of the portions of the cover with the opening in the sleeve disposed in the vicinity of the adjacent sides of the portions of the cover.

In order that the invention may be readily understood, various embodiments of it are described below in conjunction with the accompanying drawings, in which:

FIG. 1. shows a perspective view of a first embodiment of a record album of the invention, in the opened-out state;

FIG. 2 shows the record album of FIG. 1 in sectional view;

FIG. 3 shows a sectional view similar to FIG. 2 of a second embodiment of record album to hold two records;

FIG. 4 shows a detail of a third embodiment of record album, which is a modification of that of FIG. 3;

FIG. 5 shows a perspective view similar to FIG. 1 of a fourth embodiment of a record album;

FIG. 6 shows a detail of the record album of FIG. 5 in sectional view;

FIG. 7 shows a sectional view similar to FIGS. 2 and 3 of a fifth embodiment of record album;

FIG. 9 shows a perspective view similar to FIG. 1 of a seventh and preferred embodiment of a record album;

FIG. 10 shows in perspective view similar to FIG. 1 an eight embodiment of a record album;

Figure 8:
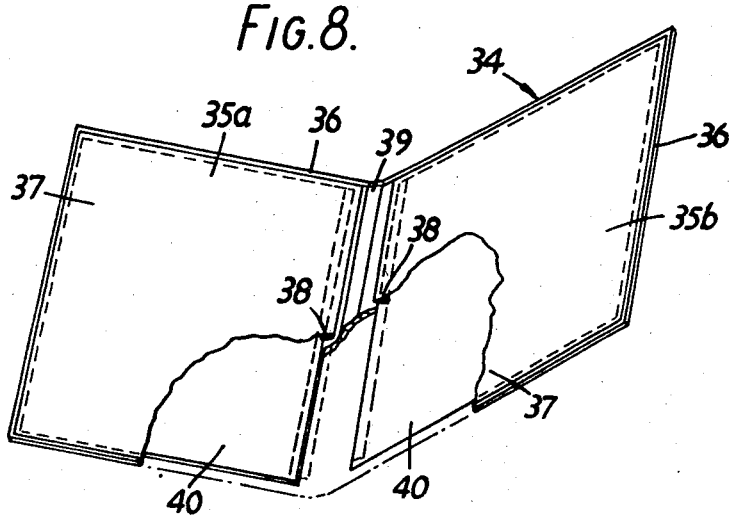
FIG. 8 shows a perspective view similar to FIG. 1 of a sixth embodiment of a record album.

Referring to FIGS. 1 and 2, a record album consists of a cover 10 formed of a pair of square portions 11a, 11b of, for instance, cardboard, joined together by means of a narrow central strip 11c, the cover 10 being formed from a single rectangular sheet which is folded at fold lines 12a, 12b to define the portions 11a, 11b and the central strip 11c. The latter is of such width as to accommodate the thickness of the other parts of the record album and the record contained therein, when the two main portions 11a, 11b of the cover 10 are folded together as shown in dotted lines at 13 in FIG. 2.

The square portions 11a, 11b and the central strip 11c can be used over their entire inner and outer sides for carrying explanatory and decorative material.

The record album of FIGS. 1 and 2 is intended to contain one gramophone record. For this purpose, a sleeve 14 is secured by adhesive to the inside face of the portion 11a of the cover 10. This sleeve 14 consists of a back sheet 15a and a front sheet 15b of transparent polymeric material. As shown in FIG. 1, these sheets are substantially square and are the same size or slightly smaller than the cover portion 11a. The sheets 15a, 15b are joined together by a weld line 16 around their three edges away from the center strip 11c, where the sheets 15a, 15b are left unjoined. The front sheet 15b is smaller in its width dimension than the back sheet 15c, so that its edge 17 is further away from the center strip 11c than the edge 18 of the back sheet 15a. A strip 19 of foamed plastics material, preferably the same material as the sheets 15a, 15b, for instance polyvinyl chloride, is provided in the open side or mouth of the sleeve 14, by being disposed between the edges 17 and 18. This strip 19 is welded by its outermost edge 20 to the subjacent edge 18 of the back sheet 15a and its innermost edge 21 lodges within the sleeve 14, inside the edge 17 of the front sheet 15b. This strip 19 provided in this way, serves to close the sleeve 14, to exert a wiping action on one or other surface of the record as it is inserted into and withdrawn from the sleeve and also tends to tilt up the edge 17, so that the open side of the sleeve can more readily receive the record as it is being put into the album.

The record is safely housed in this album and cannot fall out of the open side of the sleeve; the record may be prevented from falling out if it lodged beneath the strip 19, though it is preferable for the record to be located entirely in the region between the strip 19 and the opposite edge of the sleeve 14. As the open side of the sleeve 14 is located by the central strip 11c, it is closed by the cover 10 when the portion 11b of the latter is folded on to the sleeve 14.

As the sleeve 14 is made of polymeric material which is transparent, the record can be inspected and its exposed label read when still in the sleeve; also, the entire surface of the cover portion 11a to which the sleeve 14 is secured is visible when the record is removed, so that it can usefully be printed or otherwise decorated so as to contribute to the attractiveness and appeal of the record album. The two sheets and strip, 15a, 15b and 19, forming the sleeve 14 can be assembled and welded together by high frequency welding, in a single operation using an open square welding electrode, as explained below.

The record album shown in Fig. 3 is generally similar to that shown in FIGS. 1 and 2, but is intended to house two records. For this purpose, it has a second sleeve 22, similar in construction to the sleeve 14, secured to the inner face of the other sheet 11b of its cover 10. The latter has a correspondingly wider central strip 11c to accommodate the greater total thickness of two records housed in the sleeves 14 and 22, when the cover 10 is folded into the closed position shown in dotted lines at 23.

The two record albums shown in Fig. 3 can be made in an alternative construction, shown in Fig. 4. Instead of providing the sleeves 14 and 22 as separate identical units, each with its foam strip 19, the two sleeves are made as a single unit, consisting of a double-size back sheet 24 including an integral central strip 25, having a double-width foam strip 26 located thereover, with two separated spaced front sheets 27a, 27b. This assembly can be welded together in a single operation using an appropriately-shaped welding electrode, which includes a central member which compresses the middle region of the strip 26 as it fuses it to the sheet 24. The resulting album is substantially identical with that of Fig. 3, but has an extra layer of compressed plastics material, derived from the foam strip 26 along its center. If as is preferred the plastics materials are the same, the compressed part of the foam strip 26 becomes transparent in the welding step and thus is a virtually indistinguishable reinforcement for the central region where the sleeves 14 and 22 are joined together.

An alternative form of two-record album is shown in Figs. 5 and 6. This is in effect a cover 10 and sleeve 14 as shown in Fig. 1, having a second sleeve 28 hingedly connected to one of the closed edges of the sleeve 14; as shown in Fig. 5, the sleeve 28 is substantially identical with the sleeve 14 and is connected to its upper edge, preferably by the two sleeves being made together, so as to be connected by an integral hinge strip 29. For instance, this can be achieved by assembling a pair of double-size sheets, the upper being slightly narrower than the lower and relatively displaced so that the open sides of the resultant sleeve mouths have their upper edges placed like the edge 17 (Fig. 2), with a double-length foam strip disposed between the sheets at the edges where the open sides will be formed. This assembly can then be operated upon in a single welding step using an electrode in the form of a pair of squares to produce the double sleeve 14, 28 of Fig. 5. In use, the sleeve 28 can be folded down on to the sleeve 14 and the free part of the cover folded on top, in the arrangement shown in Fig. 6, where the folded cover is shown dotted at 30. This principle can be extended to provide albums for more than two records. For example, a three-record album can be made by providing a third sleeve on the lower edge of the sleeve 14 of Fig. 5, the strip connecting the third-sleeve to the first being wide enough to allow it to fold flat on to the back of the second sleeve 28; the central strip of the cover must also be made correspondingly wider. A four-record album can be made by providing two two-record sleeves of the kind shown in Fig. 5 one on either part of a cover. Another form of three-record album is one having a two-record sleeve on one side and a one-record sleeve on the other. Where two or more records are accommodated in a multiple-record sleeve, it preferably is arranged so that all the individual sleeves have their open sides disposed so as to come to the region of the central strip of the cover on being folded up. Multiple sleeves can also have other arrangements, however; for instance, a cover can have a two-record sleeve which is like that of Fig. 1 with a second sleeve hinged to the outer edge of the sleeve 14, the open side of the second sleeve preferably being provided at such outer edge, so that the second sleeve becomes closed as it is folded in over the first sleeve.

Another form of record album is shown in Fig. 7, which is another proposal for housing two records. In this, the cover 10 has secured to its left side 11a a double sleeve 31, formed from three superposed sheets 32a, 32b, and 32c so as to provide two sleeves having adjacent open sides. The middle sheet 32b projects beyond the two other and carries a foam strip 33a, 33b on either side. Other arrangements are possible, but this is preferred, as it retains the advantage of enabling an assembly of three sheets and two strips of foam plastics material to be welded to form the double sleeve 31 in a single welding step. The double sleeve principle shown in Fig. 7 can be extended to provide albums for larger numbers of records; for instance, and eight-record set can be accommodated in an album consisting of a two-leaf cover, like the cover 10, carrying on each side a double sleeve like that shown in Fig. 5, but with each element itself being a two-record sleeve of the kind shown in Fig. 7.

Fig. 8 shows another form of record album which differs from the ones described above in that the cover consists of joined sleeves of polymeric material. A cover 34 consists of a left sleeve 35a and a right sleeve 35b. Each consists of a square back sheet 36 welded along three of its edges to a front sheet 37 which is unjoined along one edge, where a foam plastics strip 38 is joined to the free edge of the front sheet 37, which does not extend to the corresponding edge of the back sheet 36. The two latter are joined to the opposite edges of a central strip 39, analogous to the central strip 11c, of Fig. 1 for instance, and this strip 39 can be integral with the portions of sheet material used to form the back sheets. The cover 34 is thus a one-piece construction of transparent polymeric material and can house one or two records. In order to provide readily printable areas in the album for carrying information about the record(s) in it, separate squares 40 of cardboard or other sheet material are inserted into the sleeves 35a, 35b. Their edges adjacent the central strip 39 are preferably lodged under the foam strips 38 so that the squares 40 are retained in the sleeves forming the cover 34. Modifications of this form of album include the provision of a single sleeve and a single sheet of polymeric material in place of the other sleeves and also the provision of sleeves capable of receiving more than one record each.

FIG. 9 illustrates another and preferred embodiment of a container of the invention; the container show is intended to house one gramophone record, but it can readily be made to accommodate two or more records as a set, as already explained.

The container of Fig. 9 consists of a record album, comprising a cover 71 of sheet material, in the form of a rectangular sheet divided by two closely parallel fold lines 72 about its center-line into squares forming the front, 73, and the back 74 of the cover 71. All the surfaces of the cover 71 may, if desired, be printed or otherwise provided with information or other material. The cover 71 represents the minimum amount of sheet material. e.g. cardboard, required to provide a square container having a front and a back for a circular flat object, like a record, approximately the same in diameter as the sides of the square.

A square sleeve 75 formed of two sheets 76, 77 of transparent polymeric sheet material welded together, with a foam strip 78 located within the open side or mouth 79 of the sleeve is provided to contain and provide physical and chemical protection for a gramophone record. The sleeve 75 is identical with the sleeve 14 shown in Fig. 1, but is not secured to the cover 71 by an adhesive applied to its rear surface, but by means of a strip 80 of stout transparent plastics material having a pressure sensitive adhesive on one face. The strip 80 is folded along its center and one side, 80a, is secured to the back 74 of the cover 71, with the fold adjacent the fold lines 72 and the other side, 80b is secured to the edge region of the sleeve 75. The sleeve can thus be hinged about the fold in the strip 80, so that the album can be laid upon a surface, the cover opened and both sides of a record in the sleeve can be inspected through the transparent material of the front and the back of the sleeve and the information on the recorded labels can be read without the record itself being touched. The record will not fall out of the sleeve even if the album is held up by the cover and the sleeve is allowed to hang freely from the strip 80. In order to remove the record, the mouth of the sleeve has to be opened as already explained.

If the sleeve 75 is replaced by one of the construction shown — Figs. 5–7, a two-record album is produced and larger numbers of records can be housed for display and sale by varying the make-up of the album as described herein.

Referring to Fig. 10, since records (and some other flat articles) are circular, it is immaterial how they are orientated in the sleeves, which can therefore depart form being square at the two corners remote from the open side. Fig. 10 illustrates a cover 46 similar to the cover 10 of Fig. 1, but having sleeves 47 on each side which are semi-circular in the halves remote from the center of the album, as indicated at 48.

Figure 14:
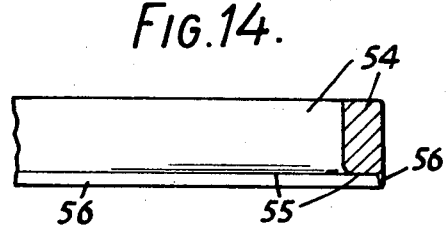
FIG. 14 shows a detail of the electrode shown in FIG. 13, taken on the line XIV—XIV therein.
Figure 13:
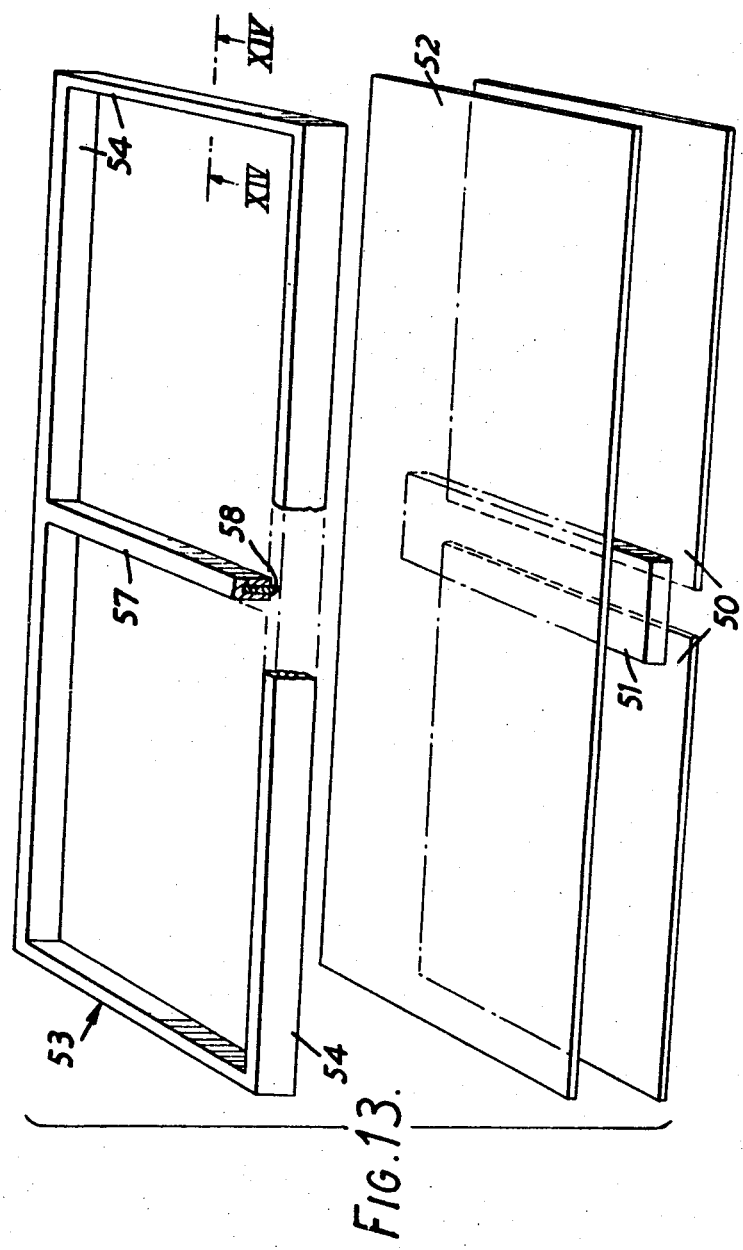
FIG. 13 shows a diagrammatic exploded perspective view of an assembly of sheets of polymeric material with an electrode.

Fig. 10 illustrates an album where the sleeves 47 can be manufactured using welding electrodes of open D shape. An assembly for making square sleeves of the kinds shown in Figs. 1, 2, 3 and 7 is shown in Fig. 13. A modification of the assembly of Fig. 13, for making sleeves of the kinds shown in Figs. 4, 5, 6 and 8 is shown in Fig. 14.

The feature of the present invention constituted by the provision of resilient strips within the opposed inner faces of the marginal part of the mouth of a sleeve, which are affixed to or formed integral with these faces at their edges adjacent to the edges of the mouth of the sleeve and have their opposite and innermost edges unsecured, is of especial importance and benefit.

Preferably, these strips are of a thermoplastic foam material, e.g. a plastics foam material such as polyurethane, which are bonded by high frequency welding to the inner faces of the material of the sleeve, which is preferably of polyvinly chloride or a similar synthetic plastics material.

The arrangement is such that each of these flaps tends to hinge along the line upon which it is bonded to the inner face of the sleeve, so that the major part or each strip tends to swing away from the inner face of the cover to which it is bonded and towards the inner face of the opposite side of the sleeve and so leaves between itself and the face of the cover to which it is secured an elongated narrow recess or space closed at a position along the line of its bonding to the inner face of the sleeve in which the circumferential edge of a contained record is trapped should the sleeve be held so that its mouth is directed downwardly, so that the record is thus prevented from falling out from the sleeve and must be removed intentionally by inserting fingers into the sleeve and withdrawing the record manually.

In addition to trapping the record in its sleeve, the two flaps abut one another face to face and so act as a dust excluder and also as a means for wiping the removing dust from a record during insertion and withdrawal of a record, which times the flaps are slightly parted as the record passes therebetween.

Figure 11:
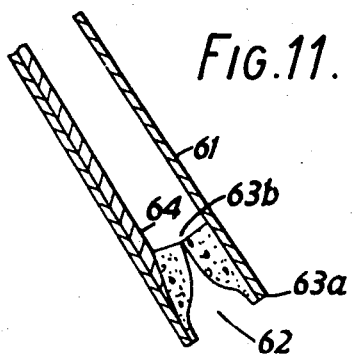
FIG. 11 is a fragmentary view illustrating how the circumferential edge of a record adjacent the mouth of the sleeve becomes trapped, so that the record will not slide out when the mouth of the sleeve is directed downwardly.
Figure 12:
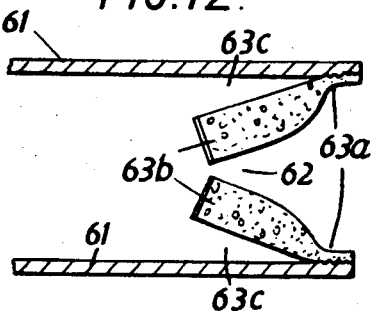
FIG. 12 is a view showing the mouth of the sleeve opened manually and illustrating how strips of foam material located within the mouth tend to hinge about their lines of attachment to the sleeve.

Referring to Figs. 11 and 12 of the drawings, the cover comprises a substantially square sleeve 61 of P.V.C. or other suitable sheet material. As previously described, this sleeve is open along one of its sides to provide a mouth 62 through which a gramophone record may be inserted into and subsequently removed and is closed along each of its remaining three edges.

The opposed inner faces of the marginal part of the mouth 62 of the sleeve are provided with resilient strips 63 which are affixed to or formed integral with these faces at their edges 63a adjacent to the edges of the mouth of the sleeve and have their opposite and innermost edges 63b, as best shown in Fig. 12, unsecured to the inner face of the sleeve 61.

These strips 63 are made of a soft, resilient material and preferably are of a synthetic plastics foam material such as a polyurethane, which are bonded, e.g. by high frequency welding, to the inner faces of the material of the sleeve 1. Each of the strips 63 tends, as best shown in Fig. 12, to hinge along a weld line on which it is bonded at 63a to the inner face so that the major part of each strip 63 behind this weld line 63a tends to swing away from the inner face of the cover and leave between itself and the cover an elongated recess or space 63c which is closed at a position along its edge 63a where it is bonded to the cover and in which the circumferential edge of a contained record 64 (Fig. 11) is trapped when the mouth 62 of the cover is directed downwardly, so that the record 64 is thus prevented from falling out and has to be removed by inserting the fingers through the mouth 62 of the sleeve and withdrawing the record manually therefrom. The strips 63a, 63 b are always in contact with one another irrespective of whether or not a record is contained in the cover.

A simpler form of album which nevertheless has many of the advantages of preceding embodiments consists of a cover of sheet material comprising first and second squares joined to and by a central strip, the first square having integral folded tabs on its three free edges. These tabs are folded over and secured to the edges of a square sheet of polymeric material, which preferably has a foam strip secured to either or both of the square where the latter are open.

In an alternative and also simple form of construction even the tabs can be omitted and, instead, the firs square is secured to the free edges of the square sheet by welding or glueing. In another simple form tabs are provided on the appropriate three sides of the square sheet of polymeric material and these are folded under and glued to the underside of the first square.

Referring to Fig. 13, two square sheets 50 of polymeric material are disposed in side-by-side relationship. Above the gap between their adjacent edges, a strip 51 of foam polymeric material is superposed and overall is located a rectangular sheet 52 of polymeric material of such a size as to have its edges above the non-adjacent edges of the square sheets 50. A combined welding electrode and cutter assembly, shown at 53, comprises a rectangular arrangement of outer weld tools 54 each having a lower edge 55 shown in Fig. 14 for compressing the sheets 50 and 52 together and an outer dependent cutter blade 56 for trimming the welded sheets. Disposed centrally of the arrangement is a central weld element 57 having a dependent central cutter blade 58 for simultaneously fusing the center of the sheet 52 to the center of the strip 51. In operation, the assembly 53 is lowered on to the pack of sheets and simultaneously heat seals them together and separates them along the center to form a pair of sleeves of polymeric material, such as those shown in Figs. 1, 2 and 3.

Figure 15:
FIG. 15 shows a detail of a modification of the electrode shown in FIG. 13.

If the assembly 53 is modified as shown in Fig. 15, by providing a central element 59 which omits a cutter blade, the resultant tool effects welding only at the center and produces a double sleeve shown in Fig. 4. If the stack of sheets is operated on inverted as compared with Fig. 14, a cover such as that shown in Fig. 8 is formed or a double sleeve such as that shown in Fig. 5, depending upon the size of the sheets 50.

The invention provides a large number of significant improvements in the design and manufacture of containers, especially in relation to the packaging, display, sale and safe keeping of gramophone records.

The containers of the invention afford the following advantages:

1. the sleeve is so constructed that it can be very readily incorporated into a cover to make a complete record album or like container and, in particular, is very easily combined with printed and other display materials;

2. the conventional paper or plastics foil inner bag or envelope in which gramophone records are housed within most forms of record container is no longer necessary and can be dispensed with, because the sleeve, especially when made of PVC or the other plastics materials mentioned is chemically suited to giving maximum protection;

3. the one or more foam strips included in the sleeve protect the records from dust and damage;

4. the transparent nature of the sleeve makes the record per se fully visible for display purposes and also assists factory quality control by enabling damaged records in their containers to be seen and removed from the production line;

5. because the sleeves are of strong construction, they have an appreciable re-use value.

I claim:

1. A container for receiving a flat article comprising a cover of sheet material having two portions which are relatively hingeable about adjacent edges thereof, a portion of polymeric material disposed adjacent the inner face of one of the two portions of the cover to provide a first space therebetween having an opening, and a strip secured along the inner face of the outermost edge of the opening thereby to form a second space at least partly within the first space between the strip and the sheet to which it is attached whereby a flat article can be located in the first space with the edge thereof retained in the second space so as to be visible through the polymeric material when the cover is opened out.

2. A container according to claim 1 wherein said cover comprises a rectangle of sheet material having spaced parallel fold lines located therein so as to define the adjacent edges of front and back portions which are square in shape.

3. A container according to claim 1 wherein said strip is formed of foam material.

4. A container for receiving a flat article comprising a cover formed from at least two substantially square portions of sheet material which are arranged side by side and are relatively hingeable about a respective one of their adjacent sides, a sleeve of polymeric material defining a first space therein and secured on the inside of at least one of the portions of the cover, the sleeve being closed at least at one edge thereof and a strip being secured along at least part of the inner face of the outermost edge of an opening provided at another edge of the sleeve whereby a second space at least partly within the first space is defined between the strip and the sleeve, wherein an edge of a flat article can be located in the second space with the article being retained in the first space.

5. A container according to claim 4 wherein said sleeve is constituted by at least two sheets secured to one another along adjacent edges, one edge of said sleeve being open to provide the opening for the insertion and removal of the flat article.

6. A container according to claim 5 wherein said edges of said sheets forming said sleeve are offset at the open edge.

7. A container according to claim 4 wherein said sleeve is secured by adhesive to the inner face of one of said portions of said cover.

8. A container according to claim 4 wherein said sleeve is hingedly secured by an adhesive strip to an edge of one of said portions of said cover.

9. A container according to claim 4 wherein said opening of said sleeve is located adjacent the hingeable area formed between said portion of said cover.

10. A container according to claim 4 wherein said opening of said sleeve is located adjacent a free edge of said cover.

11. A container according to claim 4 wherein said sleeve has at least one further sleeve hingedly attached to at least one of its non-open edges.

12. A container according to claim 4 wherein said strip is formed of foam material, which is secured to the sleeve by heat-seal welding.

* * * * *